United States Patent [19]
Suzuki

[11] Patent Number: 5,351,658
[45] Date of Patent: Oct. 4, 1994

[54] INTAKE SYSTEM FOR ENGINE

[75] Inventor: Naoki Suzuki, Shizuoka, Japan

[73] Assignee: Suzuki Motor Corporation, Shizuoka, Japan

[21] Appl. No.: 166,385

[22] Filed: Dec. 13, 1993

[30] Foreign Application Priority Data

Dec. 28, 1992 [JP] Japan .................. 4-361529

[51] Int. Cl.⁵ ............................................. F02M 35/10
[52] U.S. Cl. ............................................. 123/184.36
[58] Field of Search ........ 123/52 M, 52 MV, 52 MC, 123/52 MB, 559.1

[56] References Cited

U.S. PATENT DOCUMENTS

| | | | |
|---|---|---|---|
| 4,827,879 | 5/1989 | Ohmi et al. | 123/52 MV |
| 5,005,536 | 4/1991 | Suzuki et al. | 123/52 MV |
| 5,063,885 | 11/1991 | Yoshioka | 123/52 MV |
| 5,081,962 | 1/1992 | Kurokawa et al. | 123/52 MV |
| 5,123,382 | 6/1992 | Aoki et al. | 123/52 MV |

FOREIGN PATENT DOCUMENTS 60-62654  4/1985  Japan .

Primary Examiner—Tony M. Argenbright
Assistant Examiner—M. Macy
Attorney, Agent, or Firm—Flynn, Thiel, Boutell & Tanis

[57] ABSTRACT

An intake pipe is connected to an upstream side of a throttle valve of an engine having first and second cylinder banks of a cylinder block formed in a V-like configuration. An intake path is branched, at its intermediate part on a downstream side of the throttle valve, into first and second branch paths by a branch tube, and the first and second branch paths are provided at their downstream end portions with first and second surge tanks, respectively. The first and second surge tanks are connected to each other through a communication pipe. An upper portion of the intake pipe is disposed between the first and second surge tank and under the communication pipe and is firmly secured directly to the communication pipe.

7 Claims, 3 Drawing Sheets

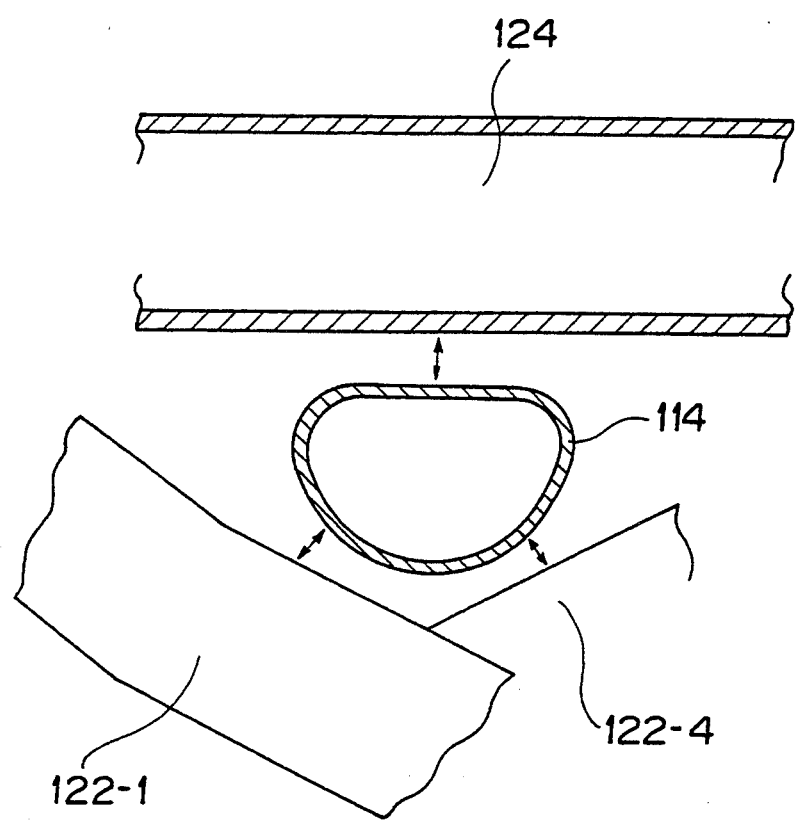

INTAKE SYSTEM FOR ENGINE

FIELD OF THE INVENTION

This invention relates to an intake system for an engine, and particularly to an intake system for an engine in which first and second cylinder heads are mounted respectively on first and second cylinder banks of a cylinder block, and first and second head covers are placed respectively on the first and second cylinder heads so as to form a V-like configuration.

BACKGROUND OF THE INVENTION

Among engines mounted on a vehicle, there are engines in which cylinders are arranged in series, another engine in which cylinders are placed opposite to each other, and also a V-shaped engine in which cylinder banks are arranged in a letter V-like configuration.

In some of the above V-shaped engines, first and second cylinder heads are respectively placed on first and second cylinder banks of a cylinder block, and a bearing cap for supporting a crank shaft in cooperation with the cylinder block is attached to a lower part of the cylinder block. In the V-shaped engines, in order to install auxiliary devices such as a compressor and a power steering pump for an air-conditioner, the cylinder block is further provided with a bracket for mounting the auxiliary devices thereto and also with a mounting bracket for supporting an engine on a vehicle body.

As one example of the intake system for an engine, there is a system disclosed in a published Japanese Patent Application No. 60-62654. The intake system for a V-shaped engine disclosed in this publication is constituted such that an intake passage for the V-shaped engine comprises two surge tank portions formed by surge tanks integral with upper portions of branch paths branched off from the surge tanks, and a crossed-manifold portion in which the branch paths extending from opposite sides are alternately intersected at their downstream portions, and walls constituting the branch paths at the crossed-manifold portion being commonly possessed by and between the adjacent branch paths, each of the branch paths at the crossed-manifold portion being provided with a fuel injection nozzle, the crossed-manifold portion being tightly secured to the two banks by fastener means extending through the adjacent branch paths, thereby enhancing attachability and attaining a compact dimension of the intake path.

As shown in FIG. 3, in the conventional intake system for an engine, a V-shaped engine 102 comprises first and second cylinder heads, not shown, placed respectively on first and second cylinder banks 106-1, 106-2 of a cylinder block 104, first and second head covers 108-1, 108-2 being provided respectively to the first and second cylinder heads, a bearing cap, not shown, being attached to a lower part of the cylinder block 104, and an oil pan (not shown) being attached to a lower part of the bearing cap. A crank shaft (not shown) is rotatably supported by the cylinder block 104 and also by the bearing cap (not shown) in a forward and backward direction relative to the engine 102.

The engine 102 comprises, for example, six cylinder units, three on one side and the remaining three on the other side, and an intake path communicating with those cylinder units. A throttle valve, not shown, is disposed within a throttle body 112. An intake pipe 114 is connected to an upstream side of the throttle body 112, and a downstream side of the throttle body 112 is branched into first and second branch paths 118-1, 118-2 by a branch tube 116. First and second surge tanks 120-1, 120-2 are connected respectively to downstream side end portions of the first and second branch paths 118-1, 118-2. The first surge tank 120-1 on one side is connected to the cylinder units on one side through first to third intake tubes 122-1 to 122-3, while the second surge tank 120-2 on the other side is connected to the cylinder units on the other side through fourth to sixth intake tubes 122-4 to 122-6.

The intake path 110 comprises the intake pipe 114, the throttle body 112, the branch tube 116, the surge tanks 120-1, 120-2, and the first to sixth intake tubes 122-1 to 122-6. The first and second surge tanks 120-1, 120-2 are communicated with each other through a communication path 124.

When the intake pipe 114 is placed between the first and second cylinder banks 106-1, 106-2 in such a manner as to extend under a lower part of the communication path 124, it has a predetermined space, as shown in FIG. 4, relative to the first to sixth intake tubes 122 and the communication path 124. The intake pipe 114 is firmly secured to the first to sixth intake tubes 122-1 to 122-6 by fixing bolts, not shown. As a consequence, it is practically impossible to set the configuration and diameter of the intake pipe large. Since the intake pipe cannot be made large enough in diameter, intake efficiency is bad. This is disadvantageous in view of practical use.

If the diameter of the intake pipe is set large enough in order to enhance the intake efficiency, it becomes necessary to increase the space between the first and second cylinder banks as well as the space relative to the lower part of the communication path in order to allow the passage of the intake pipe. The arrangement for firmly securing the intake pipe to the first to sixth intake tubes brings about such inconveniences that a span for mounting is increased and the mounting areas are reduced in strength.

According to the present invention, in order to obviate the above inconveniences, there is provided an intake system for an engine, which intake pipe is connected to an upstream side of a throttle valve of the engine having first and second cylinder banks of a cylinder block formed in a V-like configuration. The intake path, at its intermediate part downstream of the throttle valve, is branched into first and second branch paths by a branch tube, and the first and second branch paths are provided at their downstream end portions with first and second surge tanks, respectively, the first and second surge tanks being connected to each other through a communication path. An upper portion of the intake pipe is disposed between the first and second surge tanks and under the communication path and is firmly secured to the communication path.

With the above-mentioned construction of the present invention, when the intake pipe is placed between the first and second surge tanks in such a manner as to extend under the communication path, an upper part of the intake pipe is firmly secured to the communication path, thereby enabling an increase in the diameter of the intake pipe to the extent good enough for intake efficiency while enabling the providing of a compact system.

BRIEF DESCRIPTION OF THE DRAWINGS

FIG. 4 is a schematic enlarged sectional view taken on line 4—4 of FIG. 3.

DETAILED DESCRIPTION

An embodiment of the present invention will now be described in detail with reference to FIGS. 1 and 2 of the drawings.

Figure 1:
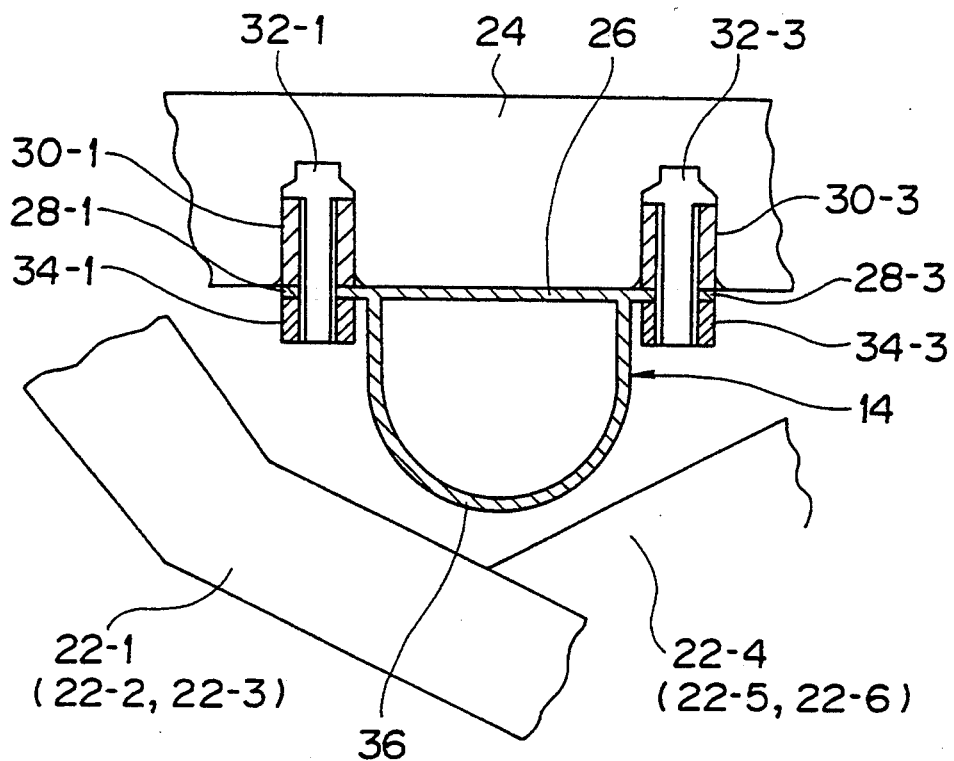
FIG. 1 is a schematic enlarged sectional view of a mounting condition of an intake pipe according to an embodiment of the present invention.
Figure 2:
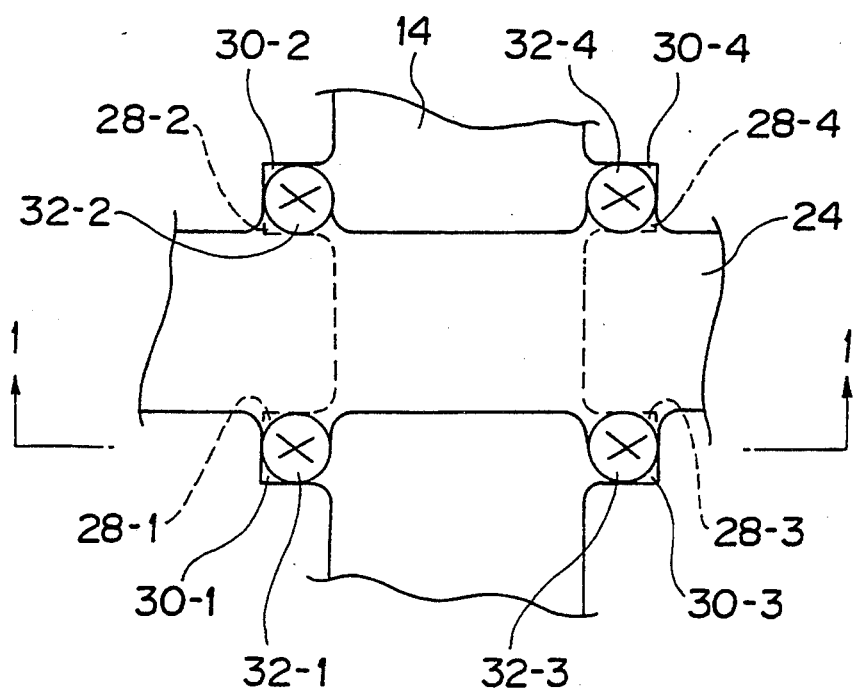
FIG. 2 is a schematic enlarged plan view of a mounting area of the intake pipe.
Figure 3:
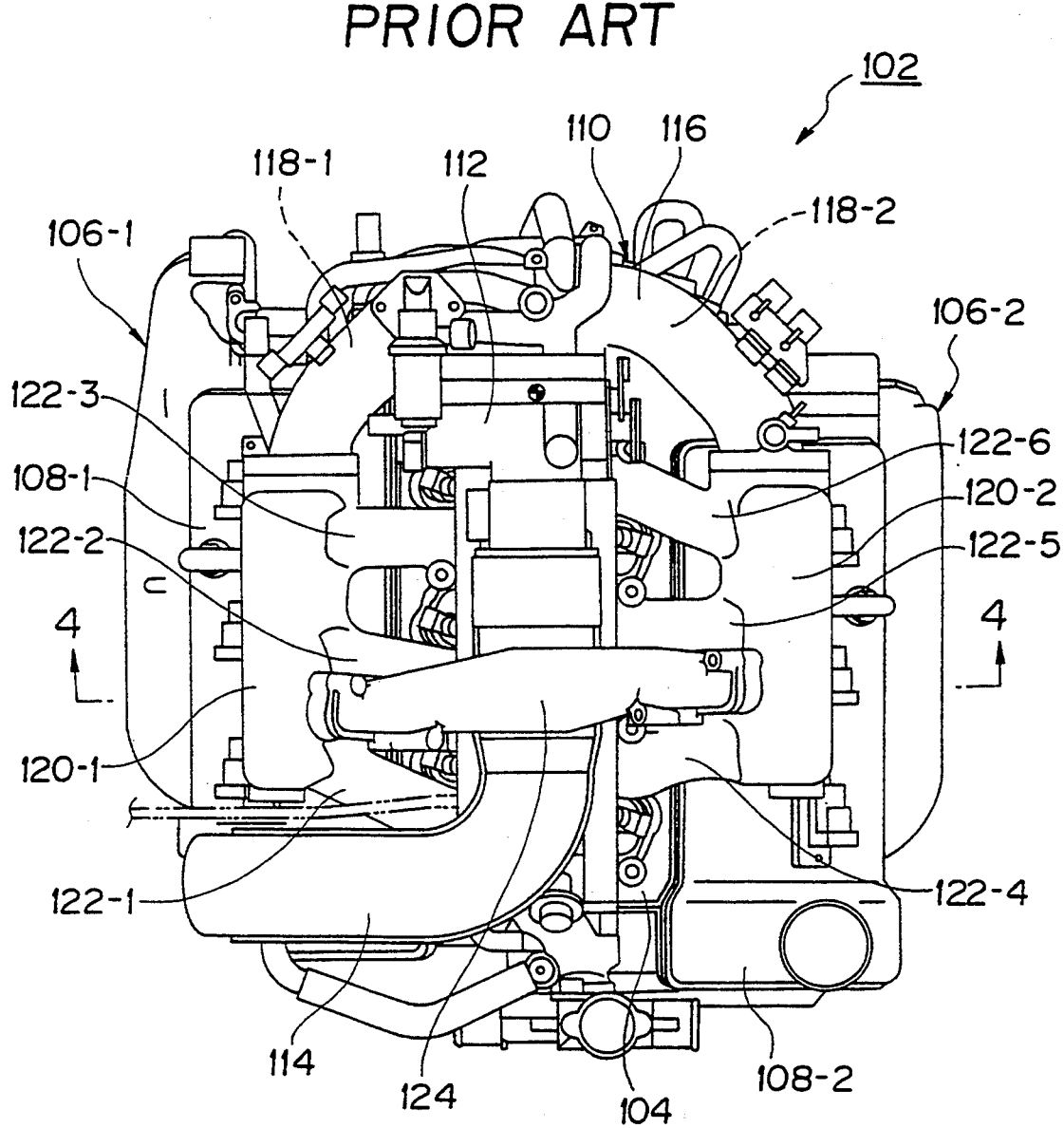
FIG. 3 is a schematic plan view of a V-shaped engine according to the prior art.

In FIG. 1, reference numerals 22-1 to 22-3 respectively denote first to third intake tubes communicating with a first surge tank on one side of a V-shaped engine, reference numerals 22-4 to 22-6 respectively denote fourth to sixth intake tubes communicating with a second surge tank on the other side of the engine, and reference numeral 24 denotes a communication path or tube for connecting the first and second surge tanks in communication with one another. The surge tanks are positioned as shown in FIG. 3.

An upper part of an intake pipe 14 disposed between the first and second surge tanks and under the communication tube 24 and is firmly secured to the communication tube 24.

Specifically, as shown in FIG. 1, the intake pipe 14 is formed into a letter U-like configuration in cross-section, and a flat top wall portion 26 at its upper part is in contact with the underside of the communication tube 24. Outwardly-extending first fixing areas or flanges 28-1 to 28-4 are formed at four places on the flat wall portion 26, two on each side of the intake tube 14, with the two on each side being longitudinally spaced apart so as to be disposed adjacent opposite sides of the tube 24.

Second fixing areas 30-1 to 30-4 project outwardly from opposite sides of the communication pipe 24 coincident with and directly over the first fixing areas 28-1 to 28-4. Fixing areas 30-1 to 30-4 are hollow tubes or hubs having openings vertically therethrough which align with openings through the flanges 28-1 to 28-4. The intake pipe 14 is firmly secured to the communication tube 24 by fixing bolts 32-1 to 32-4 inserted into and through the tubes 30-1 to 30-4 and flanges 28-1 to 28-4 from above and secured by nuts 34-1 to 34-4.

With the arrangement described above, the flat top wall portion 26 at the upper part of the intake pipe 14 is in contact with the communication pipe 24, but the arcuate lower part 36 of the intake pipe 14 has a predetermined space separating it from the first to third intake tubes 22-1 to 22-3 on one side and the fourth to sixth tubes 22-4 to 22-6 on the other side.

OPERATION

When the intake pipe 14 is placed above the first to third intake tubes 22-1 to 22-3 on one side and also above the fourth to sixth intake tubes 22-4 to 22-6 on the other side, but under the communication tube 24, the fixing flanges 28-1 to 28-4 formed on the flat upper wall portion 26 of the intake pipe 14 and the fixing hubs or flanges 30-1 to 30-4 of the communication tube 24 are fixed to each other by the bolts 32-1 to 32-4 and nuts 34-1 to 34-4 in order to firmly secure the intake pipe 14 to the communication pipe 24.

By doing this, a space that would otherwise be formed between the upper part of the intake pipe 14 and the communication pipe 24 can be eliminated and this space can effectively be used. As a result, the diameter of the intake pipe 14 can be increased so that intake efficiency can be enhanced. This is advantageous in view of practical use.

Furthermore, by firmly securing the intake pipe 14 directly to the communication pipe 24, the construction of the fixing areas 28, 30 can be made compact and the cost can be reduced. This is also advantageous from an economical view point.

When the intake pipe 14 is secured to the first to third intake tubes 22-1 to 22-3 on one side and to the fourth to sixth intake tubes 22-4 to 22-6 on the other side, a span for mounting becomes long and therefore the mounted portion is required to have a configuration with increased strength. However, owing to the arrangement whereby the intake pipe 14 is firmly secured to the communication pipe 24 by fixing the first fixing areas 28-1 to 28-4 and the second fixing areas 30-1 to 30-4 to each other using the bolts 32-1 and 32-4 and nuts 34-1 and 34-4, a rigid mounted structure can be obtained. Since the mounting area can be increased in strength to the extent desired there is no inconvenience in view of strength requirements.

Furthermore, by deliberately setting the diameter of the intake pipe 14, it is possible to increase the diameter and hence flow area of the intake pipe and reduce the space between the banks. Therefore, a compact size of the entire engine assembly can be realized.

The present invention is not limited to the above embodiment, and various changes and modifications can be made.

For example, in the embodiment of the present invention, the intake pipe 14 is formed into a letter U-like configuration in section, but it may have a letter V-like configuration or any other suitable configurations coincident with the sectional configuration of the portion where the intake pipe is placed.

As described in the above, according to the present invention, there is provided a construction in which an intake pipe is connected to an upper stream side of a throttle valve of the engine comprising first and second cylinder banks of a cylinder block formed in a letter V-like configuration, and intake path is branched, at its intermediate part on a downstream side of the throttle valve, into first and second branch paths by a branch tube, and the first and second branch paths are provided at their end portions on the downstream side with first and second surge tanks, respectively, the first and second surge tank being connected to each other through a communication pipe, an upper portion of the intake pipe disposed between the first and second surge tank and under the communication pipe being firmly secured to the communication pipe. Accordingly, a space that would otherwise be formed between the upper part of the intake pipe and the communication pipe is eliminated and this space can effectively be used. As a result, the diameter of the intake pipe can be increased so that intake efficiency can be enhanced. Furthermore, by firmly securing the intake pipe directly to the communication pipe, the construction of the fixing areas can be made compact and the cost can be reduced. Moreover, a rigid mounting structure can be obtained.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An intake system for a V-type engine, in which an intake pipe is connected to an upstream side of a throttle valve of an engine having first and second cylinder banks of a cylinder block formed in a V-like configuration, an intake path is branched, at its intermediate part on a downstream side of said throttle valve, into first and second branch paths by a branch tube, and said first and second branch paths are provided at their downstream end portions with first and second surge tanks respectively, said first and second surge tanks being connected to each other through a communication pipe, the intake pipe being disposed between said first and second surge tanks and under said communication pipe and the upper wall portion of said intake pipe is fixedly secured to said communication pipe.

2. A system according to claim 1, wherein the upper wall portion of the intake tube contacts the underside of the communication pipe, and releasable fastener means directly fixedly secure the intake tube and communication pipe together where they transversely cross one another.

3. A system according to claim 2, wherein the fastener means includes four fasteners positioned at four corner locations which effectively straddle the crossing of the intake tube and communication pipe.

4. A system according to claim 3, wherein each fastener includes a first flange part fixed to the communication pipe, a second flange part fixed to the intake tube and positioned directly under the first flange part, the flange parts having aligned openings, and a removable threaded fastener element positioned in the aligned openings.

5. A system according to claim 3, wherein the intake tube is of an upright V-shaped cross section.

6. In a V-type engine having first and second cylinder banks provided on a cylinder block formed in a V-shaped configuration, a throttle valve mounted on the engine generally in a V-shaped space defined between the first and second cylinder banks, a supply pipe connected to an upstream side of the throttle valve, and an intake passage connected to and extending downstream from the throttle valve and including first and second downstream intake branch paths which respectively connect to first and second intake manifolds which are coupled respectively to the first and second cylinder banks, and a communication pipe extending transversely between and being connected directly to said first and second intake manifolds, said communication pipe extending across said V-shaped space, the improvement wherein the supply pipe extends longitudinally through the V-shaped space for connection to the upstream side of the throttle valve and is positioned below the communication pipe and generally between the first and second intake manifolds so as to as to transversely cross below the communication pipe, and wherein the communication pipe and the supply pipe are directly fixedly joined to one another substantially at the region of crossing.

7. An engine according to claim 6, wherein an upper wall portion of the supply pipe contacts an underside of the communication pipe, and releasable fastener means directly fixedly secure the supply pipe and the communication pipe together where they transversely cross one another.

* * * * *